Dec. 8, 1936.            W. MERTÉ                2,063,178
                   PHOTOGRAPHIC OBJECTIVE
                   Filed Jan. 24, 1935        3 Sheets-Sheet 1

$r_1 = +20.0$
$r_2 = +17.0$
$b = 0.20$
$d = 20.0$
$n_d = 1.6400$
$f = 108.95$
$\rho_1 = +20.0 + 5.188 \cdot 10^{-6} \cdot 20.0^4 \cdot \varphi^4$ $r_1 = +16.155$
$r_2 = +16.155$
$b = 0.305$
$d = 7.54$
$n_d = 1.6197$
$f = 146.0$
$\rho_1 = +16.155 + 9.5223 \cdot 10^{-6} \cdot 16.155^4 \cdot \varphi^4$
$\quad - 3.9504 \cdot 10^{-8} \cdot 16.155^6 \cdot \varphi^6$
$\quad + 3.121 \cdot 10^{-10} \cdot 16.155^8 \cdot \varphi^8$
$\quad - 9.5852 \cdot 10^{-13} \cdot 16.155^{10} \cdot \varphi^{10}$ Inventor:
Willy Merté

$r_1 = r_2 = -r_3 = -r_5 = -16.155$ $r_4 = \pm \infty$ $d_1 = 7.54$ $b_1 = 0.305$ $b_2 = 0.305$ $d_2 = 6.1$ $d_3 = 1.44$ $f = 62.2$ $\rho_2 = -\rho_3 = -16.155 - 9.5223 \cdot 10^{-6} \cdot 16.155^4 \cdot \varphi^4$
$\qquad + 3.9504 \cdot 10^{-8} \cdot 16.155^6 \cdot \varphi^6$
$\qquad - 3.121 \cdot 10^{-10} \cdot 16.155^8 \cdot \varphi^8$
$\qquad + 9.5852 \cdot 10^{-13} \cdot 16.155^{10} \cdot \varphi^{10}$

|  | $L_1$ | $L_2$ | $L_3$ |
|---|---|---|---|
| $n_d$ = | 1.6197 | 1.6197 | 1.6205 |
| $\nu$ = | 60.2 | 60.2 | 36.2 |

Inventor:
Willy Merté

$r_1 = r_2 = -9.0$ $r_3 = +12.0$
$r_4 = -20.0$
$r_5 = +11.8$
$d_1 = 5.0$
$b_1 = 0.5$
$b_2 = 0.01$
$d_2 = 5.2$
$d_3 = 0.8$
$f = 34.2$ $\rho_2 = -9.0 - 8.026 \cdot 10^{-5} \cdot 9.0^4 \cdot \varphi^4$
$\quad + 3.5531 \cdot 10^{-7} \cdot 9.0^6 \cdot \varphi^6$
$\quad - 5.3976 \cdot 10^{-10} \cdot 9.0^8 \cdot \varphi^8$
$\quad - 2.5585 \cdot 10^{-12} \cdot 9.0^{10} \cdot \varphi^{10}$

|  | $L_1$ | $L_2$ | $L_3$ |
|---|---|---|---|
| $n_d =$ | 1.600 | 1.670 | 1.670 |
| $\nu =$ | 60.6 | 47.4 | 32.2 |

Inventor:
Willy Merté

Patented Dec. 8, 1936

2,063,178

UNITED STATES PATENT OFFICE 2,063,178

PHOTOGRAPHIC OBJECTIVE

Willy Merté, Jena, Germany, assignor to the firm of Carl Zeiss, Jena, Germany

Application January 24, 1935, Serial No. 3,250
In Germany January 30, 1934

3 Claims. (Cl. 88—57)

It has been suggested that a deformed surface be used in the manufacture of photographic objectives having high optical efficiency and a construction which is simpler than the one generally used. These objectives are especially converging menisci with a front diaphragm the convex exterior surface of which is deformed and whose two radii of vertex curvature are smaller than the focal length of the meniscus. In the known case, the concave side of the meniscus faces the diaphragm.

Experience has proved, however, that objectives which have a comparatively large diaphragm aperture and are to produce sharp images of rather large image fields in which the spherical deviations as well as the deviations of the ray pencils inclined relatively to the axis are to be small offer especially favorable results when, according to the invention, the convex exterior surface of the meniscus faces the diaphragm and when the diaphragm is in close proximity to the meniscus, so that the pencil of principal rays traverses the deformed surface only near the optical axis.

This construction of the objective makes it possible to neutralize the astigmatism and the image curvature by suitably bending the meniscus and to counteract the deviations of finitely open object ray-pencils by suitably deforming the convex surface. The pencil of principal rays is the pencil which consists of the rays intersecting each other at the centre of the diaphragm, and an object ray pencil is a pencil emanating from a point which lies in the object space and in front of the Gauss focal plane. When assuming the said position, the diaphragm obviously makes the pencil of principal rays traverse the deformed surface near the vertex of this surface. As a consequence, the pencil of principal rays is influenced by the deformed surface not so much as are the object ray pencils, which traverse the deformed surface also at a great distance from the vertex. It is assumed to be quite sufficient when the marginal rays of an axial object ray pencil have at full aperture of the diaphragm such a height of incidence at the deformed surface as surpasses that of those principal rays in the case of which the correction of the astigmatism as well as of the sagittal and the tangential image curvatures is still tolerable, that is to say in the case in which the deviations of the principal rays amount to at most a few percent of the focal length.

When chromatic correction is neglected, the meniscus may be one single uncemented lens. Otherwise, the meniscus is to be subdivided into a plurality of lenses cemented to each other. The diaphragm is to face the object when the object is to be reduced, and it is to face the image when the object is to be magnified.

Results which are even better can be obtained by means of a double objective consisting of two corresponding convergent menisci the convex surfaces of which face the diaphragm. In this case, it is not necessary to deform the two menisci, it being very often sufficient for obtaining spherical correction to deform the convex exterior surface of one of the menisci, which means, however, that the single members are not corrected spherically in themselves. It is also possible in this case to provide that the repartition of the correction on the surfaces is different from that on a single meniscus.

The drawings and the following tables have reference to four constructional examples of objectives according to the invention.

In these drawings, each figure represents an objective in a section through the axis of this objective.

Figure 3:
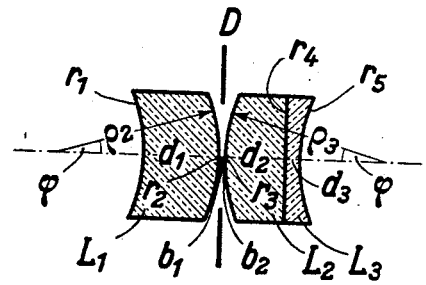

Figure 3 shows a double objective consisting of two menisci whose convex surfaces, which are deformed, face each other and have radii of vertex curvature $r_2$ and $r_3$, respectively. The front meniscus is a single lens having a thickness $d$, and the rear meniscus consists of two cemented lenses having thicknesses $d_2$ and $d_3$. The diaphragm D lies between the two menisci and is at distances $b_1$ and $b_2$ from the front and the rear meniscus, respectively.

Figure 4:
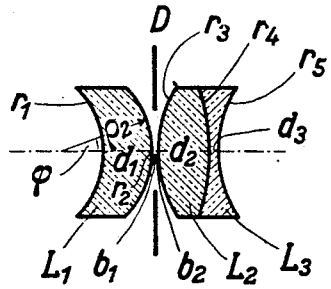

Figure 4 shows a double objective consisting of two menisci whose convex surfaces face each other, the front meniscus being a single lens which has a thickness $d$ and whose convex surface is deformed, and the rear meniscus consists of two lenses which have thicknesses $d_2$ and $d_3$ and only spherical refracting surfaces. In the tables and in the drawings, the vector of the radius of a deformed surface, which emanates from the centre of the sphere of vertex curvature of the corresponding surface, is designated $\rho$ and given the respective index. This vector depends on the angle $\varphi$, which is included by the said vector and the axis of the objective. In the deformed surfaces, $r$ is the radius of curvature at the vertex of the surface.

Figure 1:
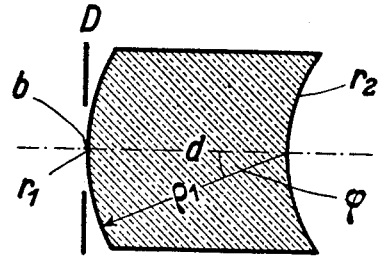
Figure 1 shows a single meniscus having a thickness $d$, a diaphragm D being disposed in front, and at a distance $b$ from the vertex, of this meniscus. The front refractive surface of the meniscus is deformed and has a radius of vertex curvature $r_1$.
Figure 2:
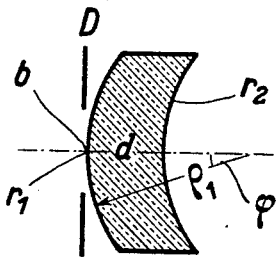
Figure 2 shows a corresponding section through a single meniscus which has a smaller thickness $d$ and whose front surface is also deformed.

The objectives represented in Figures 1 and 2 are simple uncemented menisci. They are so curved as to be without astigmatism as regards the principal rays on the object side and inclined at 15° relatively to the axis. The deformation corrects for a ratio of aperture of 1:7.7 the spherical deviations in the two objectives. Chromatic correction and other improvements in reducing the errors can be attained by making the menisci consist of two or more cemented lenses.

In the double objective according to Figure 3, two menisci according to Figure 2 face each other. With a view to obtaining chromatical correction of the entire objective, the one meniscus is made to consist of two cemented lenses. When the ratio of aperture is 1:3.5, this objective is corrected spherically, chromatically and for coma, and, as regards a principal ray inclined on the object side at 17.5° relatively to the axis, the said objective is without any astigmatism, the intermediate errors of astigmatism and the image curvature being exceedingly small.

In the double objective according to Figure 4, only the convex surface of the one meniscus is deformed. When the ratio of aperture is 1:2.7, the objective is corrected spherically, chromatically and for coma, and, as regards a principal ray on the object side and inclined at approximately 19° relatively to the axis, the said objective is without any astigmatism, the intermediate errors of astigmatism and image curvatures being very small.

As far as necessary, the constructional data and the kinds of glass are indicated in the following tables:

*First constructional example (Figure 1)*

$r_1 = +20.0$
$r_2 = +17.1$
$b = 0.20$
$d = 20.0$
$n_d = 1.6400$
$f = 108.95$
$\rho_1 = +20.0 + 5.188.10^{-6}.20.0^4.\varphi^4$

*Second constructional example (Figure 2)*

$r_1 = + 16.155$
$r_2 = + 16.155$
$b = 0.305$
$d = 7.54$
$n_d = 1.6197$
$f = 146.0$
$\rho_1 = + 16.155 + 9.5223.10^{-6}.16.155^4.\varphi^4$
$\quad -3.9504.10^{-8}.16.155^6.\varphi^6 + 3.121.10^{-10}.16.155^8.\varphi^8$
$\quad -9.5852.10^{-13}.16.155^{10}.\varphi^{10}$

*Third constructional example (Figure 3)*

$r_1 = r_2 = -r_3 = -r_5 = -16.155$
$r_4 = \pm \infty$
$d_1 = 7.54$
$b_1 = 0.305$
$b_2 = 0.305$
$d_2 = 6.1$
$d_3 = 1.44$
$f = 62.2$
$\rho_2 = -\rho_3 = -16.155 - 9.5223.10^{-6}.16.155^4.\varphi^4$
$\quad + 3.9504.10^{-8}.16.155^6.\varphi^6 - 3.121.10^{-10}.16.155^8.\varphi^8$
$\quad + 9.5852.10^{-13}.16.155^{10}.\varphi^{10}$

*Kinds of glass*

| | $L_1$ | $L_2$ | $L_3$ |
|---|---|---|---|
| | $n_d = 1.6197$ $\nu = 60.2$ | $1.6197$ $60.2$ | $1.6205$ $36.2$ |

*Fourth constructional example (Figure 4)*

$r_1 = r_2 = -9.0$
$r_3 = +12.0$
$r_4 = -20.0$
$r_5 = +11.8$
$d_1 = 5.0$
$b_1 = 0.5$
$b_2 = 0.01$
$d_2 = 5.2$
$d_3 = 0.8$
$f = 34.2$
$\rho_2 = -9.0 - 8.026.10^{-5}.9.0^4.\varphi^4 + 3.5531.10^{-7}.9.0^6.\varphi^6$
$\quad -5.3976.10^{-10}.9.0^8.\varphi^8 - 2.5585.10^{-12}.9.0^{10}.\varphi^{10}$

*Kinds of glass*

| | $L_1$ | $L_2$ | $L_3$ |
|---|---|---|---|
| | $n_d = 1.600$ $\nu = 60.6$ | $1.670$ $47.4$ | $1.670$ $32.2$ |

I claim:

1. A photographic objective comprising a converging meniscus and a diaphragm, the convex exterior surface of the meniscus being deformed and facing the diaphragm, and the radii of vertex curvature of the two exterior surfaces of the meniscus being smaller than the focal length of the meniscus, the plane of the said diaphragm and the vertex of the deformed surface having a distance apart which is smaller than, or at most equal to, one tenth of the diameter of the meniscus, so that the pencil of principal rays traverses the deformed surface near the optical axis only.

2. A photographic objective consisting of two converging menisci and a diaphragm, this diaphragm lying between the two menisci, these menisci being so provided that their convex sides face the diaphragm, the convex surface of the one of the two menisci being deformed, and the radii of vertex curvature of the two exterior surfaces of this one meniscus being smaller than the focal length of this meniscus, this meniscus being disposed in close proximity to the said diaphragm, so that the pencil of principal rays traverses the deformed surface only near the optical axis.

3. A photographic objective consisting of two converging menisci and a diaphragm, this diaphragm lying between the two menisci, these menisci being so provided that their convex sides face the diaphragm, the convex surfaces of the two menisci being deformed, the radii of vertex curvature of the two exterior surfaces of each meniscus being smaller than the focal length of the corresponding meniscus, and the two menisci being disposed in close proximity to the diaphragm, so that the pencil of principal rays traverses the deformed surfaces only near the optical axis.

WILLY MERTÉ.